March 10, 1925.

G. C. GOODHART 1,528,762

DIFFERENTIAL GEARING

Filed Sept. 29, 1923

Inventor.
Gavin C. Goodhart

Attorney.

March 10, 1925.

G. C. GOODHART

DIFFERENTIAL GEARING

Filed Sept. 29, 1923

Inventor.
Gavin C. Goodhart
M. H. Lockwood
Attorney.

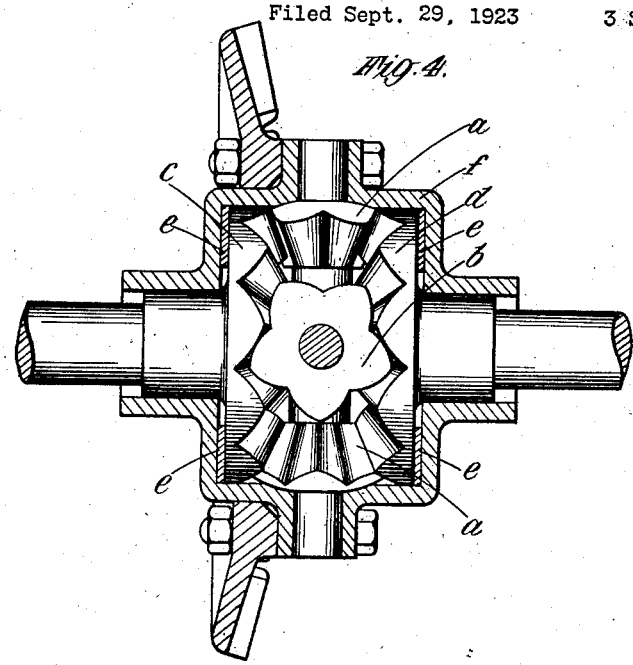
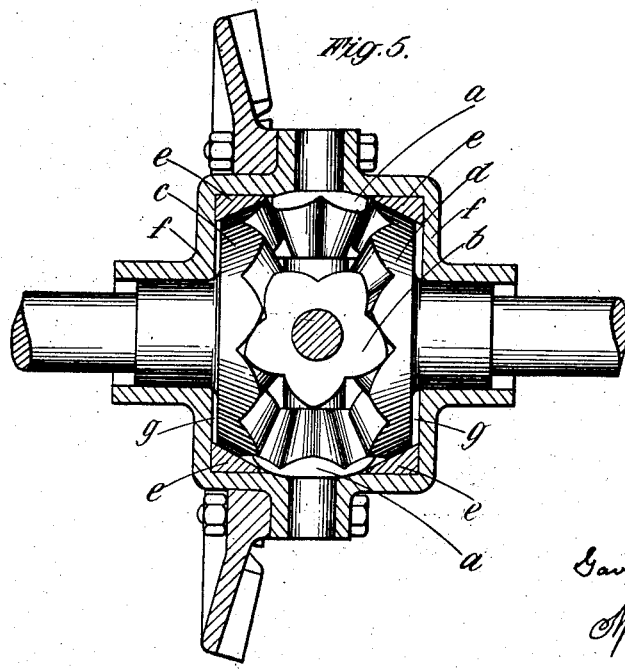

Patented Mar. 10, 1925.

1,528,762

UNITED STATES PATENT OFFICE.

GAVIN CAIRD GOODHART, OF INKPEN, ENGLAND.

DIFFERENTIAL GEARING.

Application filed September 29, 1923. Serial No. 665,536.

*To all whom it may concern:*

Be it known that I, GAVIN CAIRD GOODHART, of Inkpen, in the county of Berkshire, England, a British subject, have invented a certain new and useful Improved Differential Gearing, of which the following is a specification.

This invention relates to differential gearing of the planetary type, such as is purposely made of low mechanical efficiency. This type of differential can be used in motor vehicles to prevent the spinning of one of the driving wheels and the consequent loss of torque on the other, when the former has considerably less adhesion to the ground than the latter. In some cases the differential has been omitted entirely, partly to save expense and partly because of the undesirable properties of the ordinary differential. Where, however, the use of a differential is deemed desirable, it is to be noted that the employment of a differential of low mechanical efficiency prevents independent wheel-spin on the one hand, whilst on the other hand it allows one wheel to revolve at a greater speed than the other when required. The differential of low mechanical efficiency is, in effect, the mean between the ordinary differential and the differentialless axle, and for this reason will be referred to hereinafter as the "semi-differential".

The desired reduction in mechanical efficiency has been obtained in various ways, such as by the use of worm gears of low efficiency and, in the bevel type of differential gear, by multiplying in some way the axial thrust produced by the bevel gearing and utilizing such increased axial thrust to set up internal friction. Such devices, however, while more or less effective, usually increase the size and cost of the gear.

In my British patent specification No. 27,123 of 1911, a method is indicated by which the mechanical efficiency of the ordinary bevel type of differential gear can be reduced, by so shaping the teeth that their obliquity of reaction is materially increased beyond the normal, the increased axial thrust thus obtained producing friction either on flat or coned surfaces. The present invention relates especially to this type of "semi-differential".

Now it is well known that, with the ordinary involute tooth, when the angle of obliquity of the teeth is increased beyond a certain limit, the arcs of activity (i. e. those arcs of the respective pitch circles over which there is contact between a pair of teeth in a co-acting wheel and pinion) decrease as the angle of obliquity increases, until said arcs are less than the circular pitch, or, in other words, until one pair of teeth loses contact before the next pair of teeth makes contact. This is obviously most undesirable, as it results in much backlash, irregular action and wear of the teeth. The angle of obliquity at which this occurs varies to a certain extent according to the gear ratio, pitch, etc., but is usually in the neighbourhood of 45 degrees. It is undesirable, however, even to allow the angle of obliquity to approach this limit, as a small increase in the distance between the centres of adjacent teeth may then cause the limit to be passed.

The main object of the present invention is to provide a simple means by which the angle of obliquity can be increased far beyond the limit referred to, without the above-mentioned undesirable results. A further object is to provide an inexpensive and effective "semi-differential" gear. A still further object is to reduce the number of teeth required on the gear wheels and thus to lessen the cost of gearcutting, without necessitating the undercutting of the teeth of the planet pinions.

According to the present invention these objects are attained by making the number of planet pinions even and the number of teeth on each planet odd; the number of teeth on each sun wheel being such relatively to the number of planet pinions, and also the angular disposition of the pinions about the common axis of the sun wheels being such, that (*a*) when the pinions occupy angular positions about their own respective axes wherein a tooth on each of half the number of pinions is just about to pass out of driving contact with a tooth on one of the sun wheels, a tooth on each of the remaining pinions will be already in driving contact with a tooth on the same sun wheel, and that (*b*) when the pinions occupy angular positions about their respective axes wherein a tooth on each of the first mentioned pinions has passed completely out of driving contact with a sun wheel tooth, a tooth on each of the second-mentioned pinions will be in driving contact with a sun wheel tooth at or about the pitch line, and will therefore be in the strongest position to take the double load, whereas (c) when the pinions occupy angular positions about their own respective axes wherein a tooth on any pinion makes driving contact at or near its point with one of the sun wheels, a tooth on the other sun wheel will make driving contact at or near its point with the same pinion, and conversely as regards the succeeding pinion, and so on alternately around the series of planet pinions, with the result that the load will be distributed over all the planet pinions. In this manner continuity of action is obtained at all times, however large the angle of obliquity. In order to ensure the necessary correlation, the following conditions must be observed:—Firstly, there must be an even number of planet pinions. Secondly, there must be an odd number of teeth on each planet pinion. Thirdly, assuming that the planet pinions are spaced equidistantly around the sun wheels, the number of teeth on each sun wheel must be a multiple of half the number of planet pinions, but must not be a multiple of the whole number. Fourthly, if the third condition is not observed, the planet pinions must be unevenly spaced in such a way as to obtain the same effect.

This invention can be used, if desired, in conjunction with other known methods of increasing the friction produced by the thrust of bevel wheels, such as, for example, by mounting the bevels on conical seatings or fitting plate clutches behind them.

The invention is illustrated in the accompanying drawings wherein Figures 1 and 2 show diagrammatically the action of the teeth in one example of the improved type of differential.

Figures 4 and 5, are side elevations, partly in section, of two slightly differing forms which the invention may assume in practice.

Like letters of reference indicate corresponding parts throughout all the figures.

Figure 1:
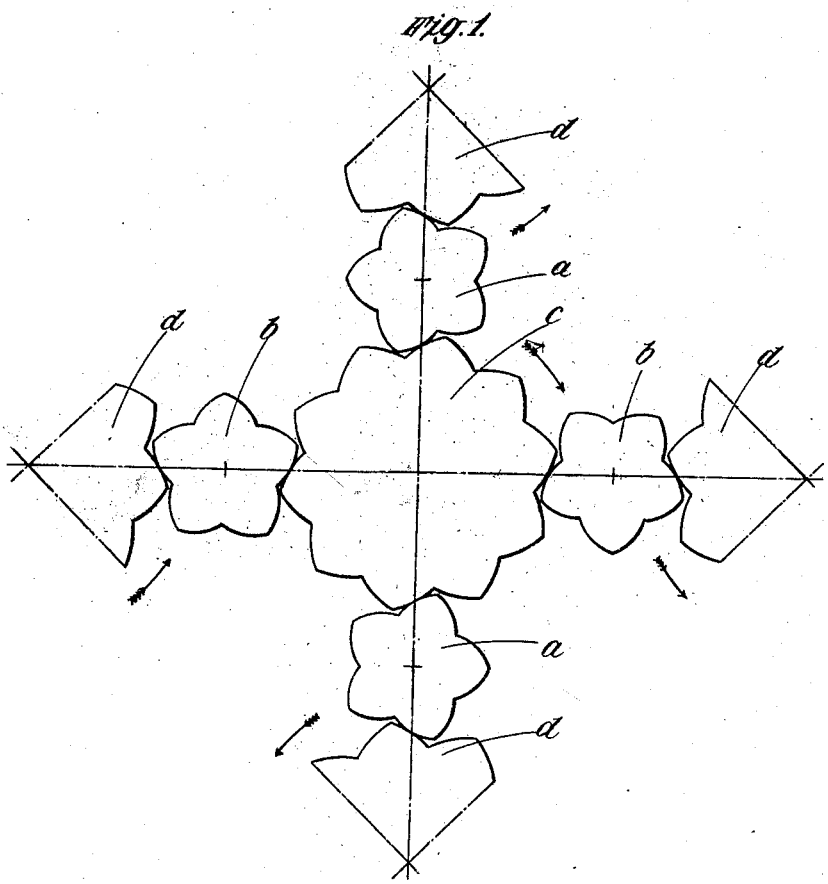
Figure 2:
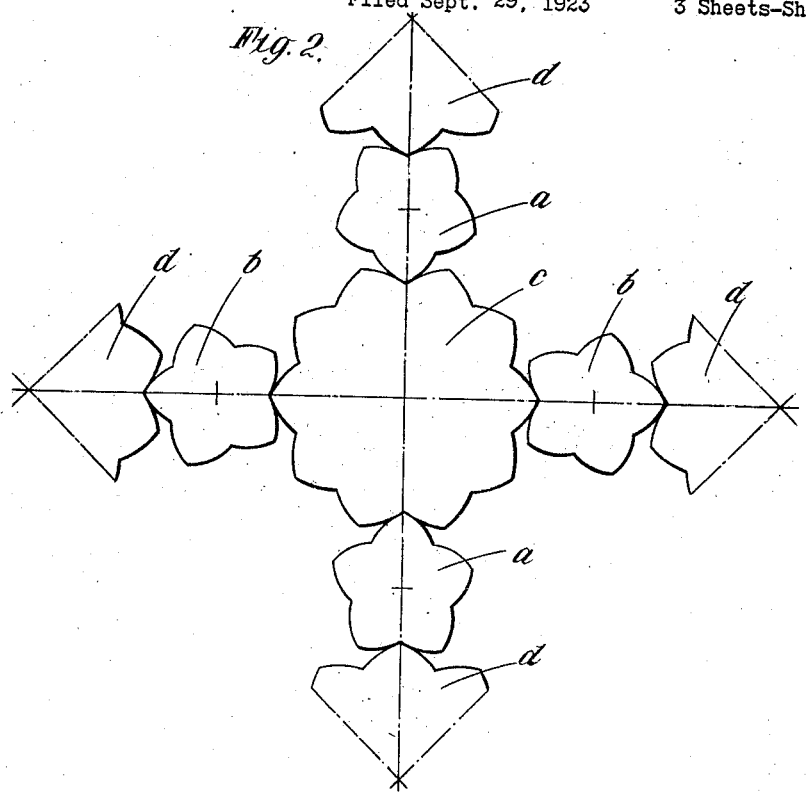
Figure 3:
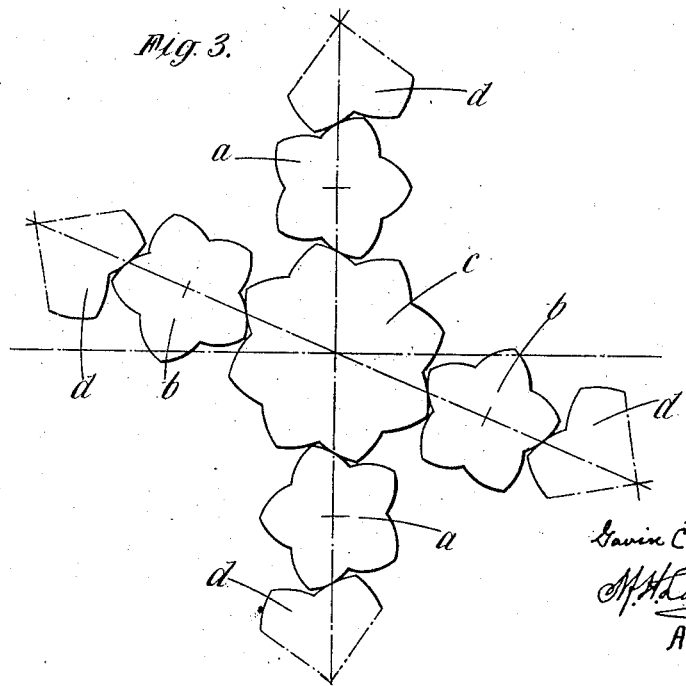
Figure 3 shows diagrammatically the action in another example of the same.

In Figures 1, 2 and 3, for the sake of clearness the bevel gears are represented as spur gears and one of the sun wheels is divided into four parts so distributed as to show its relation to each of the planetary pinions. The loss of tooth contact is somewhat exaggerated in these figures, owing to the virtual pitch circles of the bevel wheels being neglected. The teeth are ordinary involutes drawn with an angle of obliquity of 60 degrees. a, a and b, b are four planetary pinions, each having five teeth; c and d are the two sun wheels, each having ten teeth in Figures 1 and 2, and eight teeth in Figure 3.

Referring to Figure 1, when no differential action is taking place, the planets are not revolving on their axes, but are turning bodily with the casing (not shown) and transmitting the drive to the sun wheels c and d in the direction indicated by the arrows. When the parts occupy the relative positions indicated in Figure 1, the planets a, a are driving with tooth contact at the pitch line, whilst the planets b, b are in contact in the opposite direction, preventing backlash and ready to take the drive in the reverse direction. Figure 2 shows the same gears after a small amount of differential action has taken place and the wheels have turned on their axes an amount equal to one quarter of the circular pitch. It will be seen that all four planet pinions are now in contact and transmitting the drive in both directions.

As regards the manner in which the several conditions previously mentioned are satisfied by the arrangement shewn in Figures 1 and 2, it is to be observed that, firstly, there are four planet pinions—an even number; secondly, there are five teeth on each planet pinion—an odd number; and thirdly, the planet pinions are spaced equidistantly round the sun wheels, which have ten teeth. Ten is a multiple of two, which is half the number of planet pinions, but is not a multiple of four, which is the whole number of planet pinions. Thus the first three conditions are satisfied and continuity of action is obtained. As the third condition is satisfied, the fourth condition does not arise.

Figure 3 shows diagrammatically an example in which the third condition is not satisfied, as there are four planet pinions and eight teeth on each sun wheel, which is a multiple of the whole number of the planet pinions. In this case, if the planet pinions were equidistantly spaced, continuity of action would not be obtained, as all four planets would lose contact in one direction at the same moment. However, by moving the two planets b, b to the extent of half the circular pitch out of the position at right angles to the other pair, as shown in this figure, continuity of action is obtained and the fourth condition is satisfied.

Figure 4 shows an example of the invention as applied to a bevel differential gear for a motor vehicle. The gears are shown in elevation, whilst the casing is shown in section. In so far as it is of ordinary construction, this type of gear need not be described in detail. The parts of novel construction are as follows:—The gear teeth are involutes having an angle of obliquity of 60 degrees. The planets a, a, b, b four in number, have each five teeth. The sun wheels c, d have each ten teeth. The thrust washers e, e, behind the sun wheels c, d are made as large in diameter as possible so as to increase the friction and at the same time enable the washers to withstand the extra thrust. For this purpose the outer periphery of each sun wheel $c$ and $d$ is made cylindrical, instead of (as usual) perpendicular to the angle of bevel.

Figure 5 shews an arrangement similar to that of Figure 4, except that the outer periphery of each sun wheel $c$ and $d$ is conical and fits into a seating $e$, in the manner of a cone clutch. The conical seatings $e, e$ are fixed in or form part of the casing $f$, so that the friction due to the axial thrust is further multiplied in accordance with the angle of the cone. There must, of course, be a small clearance as at $g$, between the back of each sun wheel $c$ and $d$, and the inside of the casing $f$. In other respects this gear is of ordinary construction.

It will be obvious that in the arrangements illustrated in Figures 4 and 5, coned or other friction surfaces may be provided between the backs of the planet pinions and the casing, if desired.

Owing to the open nature of the teeth, as will be clearly seen from the drawings, and the low relative speed at which the sun wheels and planet pinions revolve, it is possible to use stamped teeth, thus dispensing with gear-cutting and still further reducing the cost of production.

I claim:—

1. Differential gearing of the planetary bevel wheel type, of low mechanical efficiency, comprising a pair of sun wheels and a plurality of cooperating planet pinions, the teeth of which have a predetermined wide angle of obliquity, the number of teeth on each planet pinion being odd and bearing such relation to the number of teeth on the sun wheels that, with said predetermined angle of obliquity of the teeth, only one tooth of any pinion will be in driving engagement with the teeth of a sun wheel at a time, the number of planet pinions employed and their disposition about the axis of the sun wheels being such that, upon relative movement between the planet pinions and sun wheels, continuous driving engagement is maintained therebetween by said single tooth driving engagement passing to successive pinions.

2. Differential gearing as claimed in claim 1, wherein each sun wheel has an even number of teeth, the number of pinions being even and the disposition thereof relative to the sun wheels being such that at any given moment the teeth of at least alternate pinions are in driving engagement with the teeth of the sun wheels.

3. Differential gearing as claimed in claim 1, wherein the number of planet pinions is even and the number of teeth on each sun wheel is a multiple of half the number of planet pinions but not a multiple of the whole number of planet pinions, said planet pinions being so spaced around the sun wheels that at any given moment the teeth of at least alternate pinions will be in positive driving engagement with the teeth of the sun wheels.

4. Differential gearing as claimed in claim 1, wherein the number of planet pinions is even and the angular disposition and spacing of said pinions around the sun wheels is such that at any given moment the teeth of at least alternate pinions are in positive driving engagement with the sun wheels.

5. Differential gearing of the planetary bevel wheel type, of low mechanical efficiency, the angle of obliquity of the teeth being so great that those arcs of the respective pitch circles over which there is contact between a pair of teeth in a coacting wheel and pinion, are each less than the circular pitch of the teeth; characterized by the fact that the number of planet pinions is even and the number of teeth on each planet pinion is odd, whilst the number of teeth on each sun wheel relatively to the number of the planet pinions and also the angular disposition of the pinions about the common axis of the sun wheels, are such that ($a$) when the pinions occupy angular positions about their own respective axes wherein a tooth on each of half the number of pinions is just about to pass out of driving contact with a tooth on one of the sun wheels, a tooth on each of the remaining pinions will be already in driving contact with a tooth on the same sun wheel, and that ($b$) when the pinions occupy angular positions about their own respective axes wherein a tooth on each of the first-mentioned pinions has passed completely out of driving contact with a sun wheel tooth, a tooth on each of the second-mentioned pinions will be in driving contact with a sun wheel tooth at or about the pitch line, whereas ($c$) when the pinions occupy angular positions about their own respective axes wherein a tooth on any pinion makes driving contact at or near its point with one of the sun wheels, a tooth on the other sun wheel will make driving contact at or near its point with the same pinion, and conversely as regards the succeeding pinion, and so on alternately around the series of planet pinions, with the result that continuous driving contact is maintained substantially as and for the purpose set forth.

GAVIN CAIRD GOODHART.